(12) United States Patent
Morikawa et al.

(10) Patent No.: US 12,224,452 B2
(45) Date of Patent: *Feb. 11, 2025

(54) NONAQUEOUS ELECTROLYTE SECONDARY BATTERY INCLUDING SEPARATOR WITH FILLER LAYERS ON OPPOSITE SIDES OF SUBSTRATE

(71) Applicant: Panasonic Intellectual Property Management Co., Ltd., Osaka (JP)

(72) Inventors: Yuki Morikawa, Hyogo (JP); Masanori Sugimori, Hyogo (JP); Yasunori Baba, Hyogo (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

This patent is subject to a terminal disclaimer.

(21) Appl. No.: 16/637,034

(22) PCT Filed: Nov. 2, 2018

(86) PCT No.: PCT/JP2018/040793
§ 371 (c)(1),
(2) Date: Feb. 6, 2020

(87) PCT Pub. No.: WO2019/107067
PCT Pub. Date: Jun. 6, 2019

(65) Prior Publication Data
US 2020/0243827 A1    Jul. 30, 2020

(30) Foreign Application Priority Data
Nov. 29, 2017   (JP) ................... 2017-229192

(51) Int. Cl.
*H01M 2/16* (2006.01)
*H01M 4/131* (2010.01)
(Continued)

(52) U.S. Cl.
CPC .......... *H01M 50/46* (2021.01); *H01M 4/131* (2013.01); *H01M 4/366* (2013.01); *H01M 4/58* (2013.01);
(Continued)

(58) Field of Classification Search
None
See application file for complete search history.

(56) References Cited

U.S. PATENT DOCUMENTS 5,981,107 A * 11/1999 Hamano ............. H01M 4/0416
429/231.95
2014/0287295 A1  9/2014 Honda et al.
(Continued)

FOREIGN PATENT DOCUMENTS

CN  106663770 A   5/2017
EP  2793305 A1  10/2014
(Continued)

OTHER PUBLICATIONS

International Search Report dated Jan. 29, 2019, issued in counterpart Application No. PCT/JP2018/040793 (2 pages).
(Continued)

*Primary Examiner* — Zhongqing Wei
(74) *Attorney, Agent, or Firm* — WHDA, LLP (57) ABSTRACT

In a nonaqueous electrolyte secondary battery, a separator includes a substrate, a first filler layer disposed on one side of the substrate and containing phosphate salt particles, and a second filler layer disposed on the other side of the substrate and containing inorganic particles. The separator is disposed between a positive electrode and a negative elec-
(Continued)

trode in such a manner that the side of the substrate which bears the first filler layer is directed to the positive electrode side.

3 Claims, 2 Drawing Sheets

(51) Int. Cl.
| | |
|---|---|
| H01M 4/36 | (2006.01) |
| H01M 4/58 | (2010.01) |
| H01M 4/66 | (2006.01) |
| H01M 10/0525 | (2010.01) |
| H01M 50/417 | (2021.01) |
| H01M 50/423 | (2021.01) |
| H01M 50/451 | (2021.01) |
| H01M 50/457 | (2021.01) |
| H01M 50/46 | (2021.01) |
| H01M 4/02 | (2006.01) |

(52) U.S. Cl.
CPC ....... *H01M 4/668* (2013.01); *H01M 10/0525* (2013.01); *H01M 50/417* (2021.01); *H01M 50/423* (2021.01); *H01M 50/451* (2021.01); *H01M 50/457* (2021.01); *H01M 2004/021* (2013.01); *H01M 2004/028* (2013.01)

(56) References Cited

U.S. PATENT DOCUMENTS

| | | |
|---|---|---|
| 2014/0356695 A1 | 12/2014 | Abe et al. |
| 2014/0370358 A1 | 12/2014 | Hong et al. |
| 2017/0229743 A1* | 8/2017 | Ito .................... H01M 10/4235 |

FOREIGN PATENT DOCUMENTS

| | | | |
|---|---|---|---|
| JP | 2013-105521 A | | 5/2013 |
| JP | 2013-114764 A | | 6/2013 |
| JP | 2014-180822 A | | 9/2014 |
| JP | 2015-505137 A | | 2/2015 |
| JP | 2016-72120 A | | 5/2016 |
| JP | 2016072120 A | * | 5/2016 |
| JP | 2017-63041 A | | 3/2017 |
| WO | 2016/020737 A1 | | 2/2016 |

OTHER PUBLICATIONS

The Extended European Search Report dated Jan. 12, 2021, issued in counterpart EP Application No. 18883187.9. (9 pages).
English Translation of Search Report dated Dec. 2, 2021, issued in counterpart CN Application No. 201880052381.4. (3 pages).

* cited by examiner

Figure 1

NONAQUEOUS ELECTROLYTE SECONDARY BATTERY INCLUDING SEPARATOR WITH FILLER LAYERS ON OPPOSITE SIDES OF SUBSTRATE

TECHNICAL FIELD

The present disclosure relates to nonaqueous electrolyte secondary batteries.

BACKGROUND ART

Nonaqueous electrolyte secondary batteries such as lithium ion batteries can generate abnormal heat in the event of abnormalities such as overcharging, internal short-circuits, external short-circuits, and excessive resistance heating stemming from the passage of large currents. The shutdown function of separators is known as one of the conventional techniques for suppressing heat generation from nonaqueous electrolyte secondary batteries. According to the shutdown function, a separator is melted by abnormal heat generation of the battery to close pores in the separator and thereby to interrupt ion conduction between the positive and negative electrodes, thus suppressing further generation of heat from the battery.

Known separators for nonaqueous electrolyte secondary batteries are such that a layer containing inorganic particles such as aluminum oxide or boehmite is disposed on the surface of a substrate having the shutdown function (see, for example, PTL 1). PTL 1 describes that the use of a separator which satisfies the specified structure can reduce an increase in internal resistance of a battery and achieves enhancements both in capacity and output.

CITATION LIST

Patent Literature

PTL 1: Japanese Published Unexamined Patent Application No. 2017-63041

SUMMARY OF INVENTION

As described above, an important challenge lies in that when abnormal heat is generated in a battery, the ion conduction between the positive and negative electrodes is interrupted to suppress the heat generation in the battery. However, the conventional techniques including the technique of PTL 1 are sometimes incapable of sufficiently interrupting the ion conduction between positive and negative electrodes. An object of the present disclosure is that the ion conduction between positive and negative electrodes is sufficiently interrupted in the event of occurrence of abnormal heat in a battery, and thereby further generation of heat from the battery is suppressed.

A nonaqueous electrolyte secondary battery according to one aspect of the present disclosure includes a positive electrode, a negative electrode and a separator, wherein the separator includes a substrate, a first filler layer disposed on one side of the substrate and containing phosphate salt particles, and a second filler layer disposed on the other side of the substrate and containing inorganic particles with a higher melting point than the phosphate salt particles, the separator being disposed between the positive electrode and the negative electrode in such a manner that the first filler layer is directed to the positive electrode side, and the BET specific surface area of the phosphate salt particles is not less than 5 m$^2$/g and not more than 100 m$^2$/g.

The nonaqueous electrolyte secondary battery according to one aspect of the present disclosure can benefit from sufficient interruption of ion conduction between the positive and negative electrodes in the event of occurrence of abnormal heat in the battery, and can be prevented from further generation of heat from the battery.

DESCRIPTION OF EMBODIMENTS

As mentioned earlier, separators in which a filler layer containing inorganic particles is disposed on a porous resin substrate are known. In general, porous resin substrates have the shutdown function. Thus, if abnormal heat is generated in a battery, the resin substrate executes the shutdown function to interrupt communications such as ion conduction between the positive and negative electrodes, thus suppressing further generation of heat from the battery. However, as batteries have an increased capacity and a higher energy density, the inside of the batteries becomes very hot (for example, 200° C. or above) in the event of occurrence of an abnormality, and the separator sometimes cannot retain its shape. Because the filler layer described above has no shutdown function unlike the resin substrate, a significant thermal deformation of the separator to such an extent that the separator shape cannot be maintained results in a failure to interrupt sufficiently the communications such as ion conduction between the positive and negative electrodes even though the filler layer is present, and consequently the generation of heat from the battery cannot sometimes be reduced to a sufficient extent.

In light of the circumstances discussed above, the present inventors carried out extensive studies and have found that ion conduction between positive and negative electrodes can be sufficiently interrupted in the event of occurrence of abnormal heat in a battery by providing a first filler layer containing phosphate salt particles on one side of a separator substrate, and a second filler layer containing inorganic particles with a higher melting point than the phosphate salt particles on the other side of the substrate in such a manner that the first filler layer is directed to the positive electrode side. A nonaqueous electrolyte secondary battery according to the present disclosure can suppress further generation of heat from the battery after the occurrence of abnormal heat in the battery.

When abnormal heat is generated in the nonaqueous electrolyte secondary battery according to the present disclosure due to short-circuiting or the like, the phosphate salt particles contained in the first filler layer are melted and polymerized in an accelerated manner by heat and the potential of the positive electrode to fill pores in the substrate. During this process, the second filler layer ensures the shape stability of the separator and allows the substrate to attain an enhanced shutdown effect. Thus, the migration of lithium ions between the positive and negative electrodes is inhibited, and the exothermic reaction at the time of short-circuiting is sufficiently suppressed.

Meanwhile, if the separator is such that a layer including a mixture of phosphate salt particles and inorganic particles is disposed on the substrate surface, the phosphate salt cannot fully exhibit its effect due to the area of contact between the phosphate salt and the substrate being small. Further, studies by the present inventors have found that the use of the separator according to the present disclosure which has a layered structure represented by first filler layer/substrate/second filler layer offers a higher effect in suppressing heat generation than when use is made of a separator having a layered structure represented by first filler layer/second filler layer/substrate.

Incidentally, heat generation in a battery is also accelerated when a combustible or combustion-supporting gas (such as oxygen or hydrogen) is generated from, for example, one of the electrodes due to a temperature rise within the battery stemming from internal short-circuiting of the battery and the gas migrates to and reacts with the other electrode. In the nonaqueous electrolyte secondary battery according to the present disclosure, the migration of such gas too can be sufficiently interrupted.

Hereinbelow, an example embodiment will be described in detail. The following will illustrate a cylindrical battery in which a wound electrode assembly 14 is accommodated in a cylindrical battery case. However, the structure of the electrode assembly is not limited to such a coil, and may be a stack of a plurality of positive electrodes and a plurality of negative electrodes stacked alternately on top of one another via separators. The shape of the battery case is not limited to cylindrical, and may be, for example, a metallic case such as a prismatic case (a prismatic battery) or a coin shape (a coin-shaped battery), or a resin case (a laminate battery) composed of resin films. In the present specification, numerical ranges written as value (A) to value (B) mean that the numerical quantities of interest are not less than value (A) and not more than value (B) unless otherwise mentioned.

Figure 1:
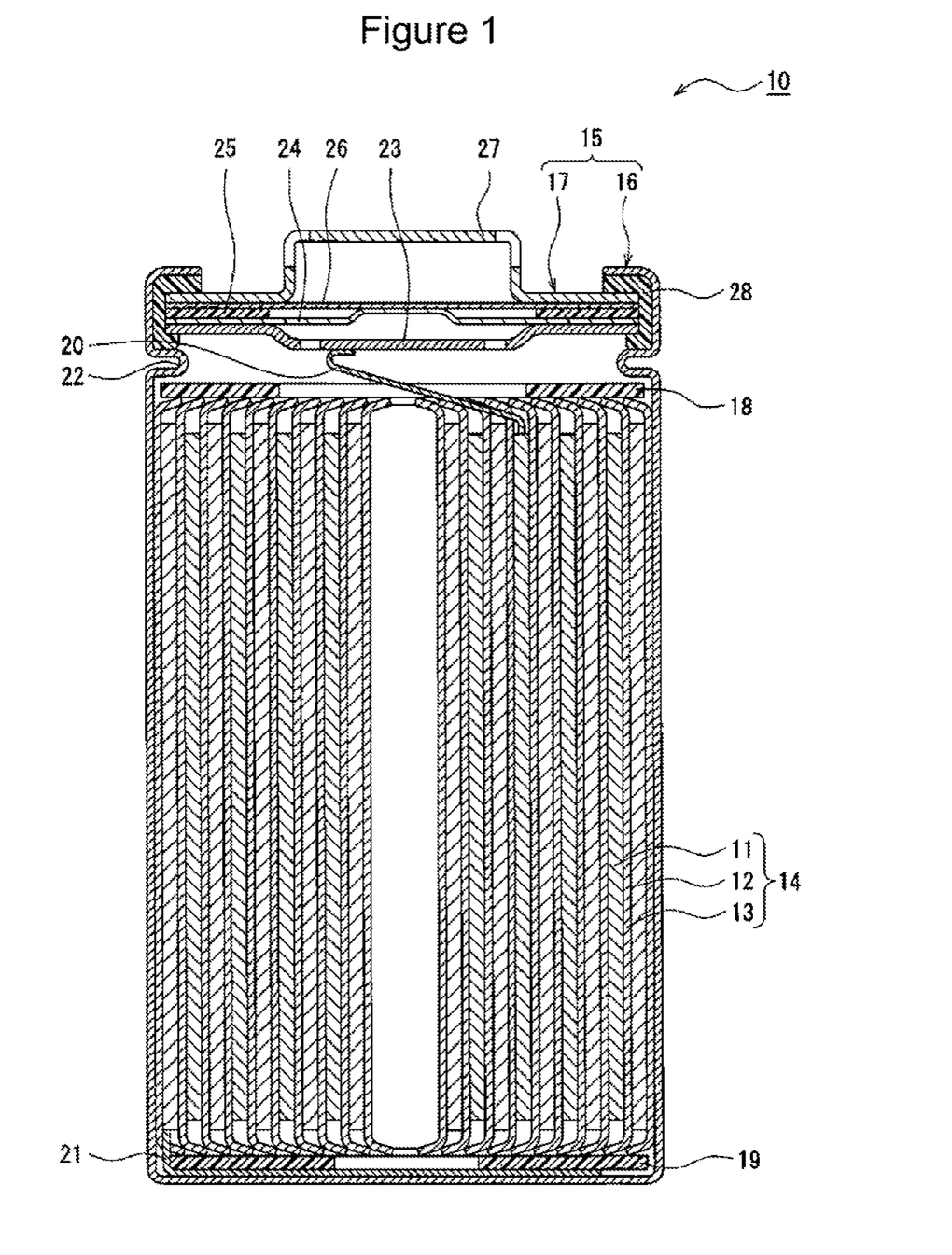
FIG. 1 is a sectional view of a nonaqueous electrolyte secondary battery according to an example embodiment.

FIG. 1 is a sectional view of a nonaqueous electrolyte secondary battery 10 according to an example embodiment. As illustrated in FIG. 1, the nonaqueous electrolyte secondary battery 10 includes an electrode assembly 14, a nonaqueous electrolyte (not shown), and a battery case 15 in which the electrode assembly 14 and the nonaqueous electrolyte are accommodated. The electrode assembly 14 includes a positive electrode 11, a negative electrode 12 and a separator 13, the positive electrode 11 and the negative electrode 12 being wound together via the separator 13 to form a wound structure. The battery case 15 is composed of a bottomed cylindrical exterior case 16, and a seal body 17 which seals the opening of the exterior case 16.

The nonaqueous electrolyte includes a nonaqueous solvent and an electrolyte salt dissolved in the nonaqueous solvent. Examples of the nonaqueous solvents which may be used include esters, ethers, nitriles, amides, and mixtures of two or more kinds of these solvents. The nonaqueous solvent may include a halogenated solvent resulting from the substitution of the above solvent with a halogen atom such as fluorine in place of at least part of hydrogen. The nonaqueous electrolyte is not limited to a liquid electrolyte, and may be a solid electrolyte such as a gel polymer. For example, a lithium salt such as $LiPF_6$ is used as the electrolyte salt.

The nonaqueous electrolyte secondary battery 10 includes insulating plates 18, 19 disposed on and under the electrode assembly 14, respectively. In the example illustrated in FIG. 1, a positive electrode lead 20 attached to the positive electrode 11 extends toward the seal body 17 through a through-hole in the insulating plate 18, and a negative electrode lead 21 attached to the negative electrode 12 extends along the outside of the insulating plate 19 to the bottom of the exterior case 16. The positive electrode lead 20 is connected by welding or the like to the lower side of a filter 23 that is a bottom plate of the seal body 17. Thus, a cap 27 that is a top plate of the seal body 17 and is electrically connected to the filter 23 serves as a positive electrode terminal. The negative electrode lead 21 is connected by welding or the like to the inner side of the bottom of the exterior case 16, thus allowing the exterior case 16 to serve as a negative electrode terminal.

For example, the exterior case 16 is a bottomed cylindrical metallic case. A gasket 28 is disposed between the exterior case 16 and the seal body 17, thus ensuring tightness in the inside of the battery. The exterior case 16 has an overhang 22 which is defined by, for example, a lateral portion projecting toward the inside and which supports the seal body 17. The overhang 22 is preferably an annular portion which extends along the circumference of the exterior case 16, and supports the seal body 17 on the upper side thereof.

The seal body 17 has a structure in which the filter 23, a lower valve 24, an insulating member 25, an upper valve 26 and the cap 27 are stacked in this order from the side adjacent to the electrode assembly 14. For example, the members constituting the seal body 17 have a disk shape or a ring shape, and the members except the insulating member 25 are electrically connected to one another. The lower valve 24 and the upper valve 26 are connected to each other in the respective central portions, and the insulating member 25 is interposed between peripheral portions of the valves. In the event that the inner pressure of the battery is increased by abnormal heat generation, the lower valve 24 is deformed so as to lift the upper valve 26 toward the cap 27 and ruptures to interrupt the current path between the lower valve 24 and the upper valve 26. If the inner pressure is further increased, the upper valve 26 is ruptured and allows the gas to be discharged through the opening in the cap 27.

Figure 2:
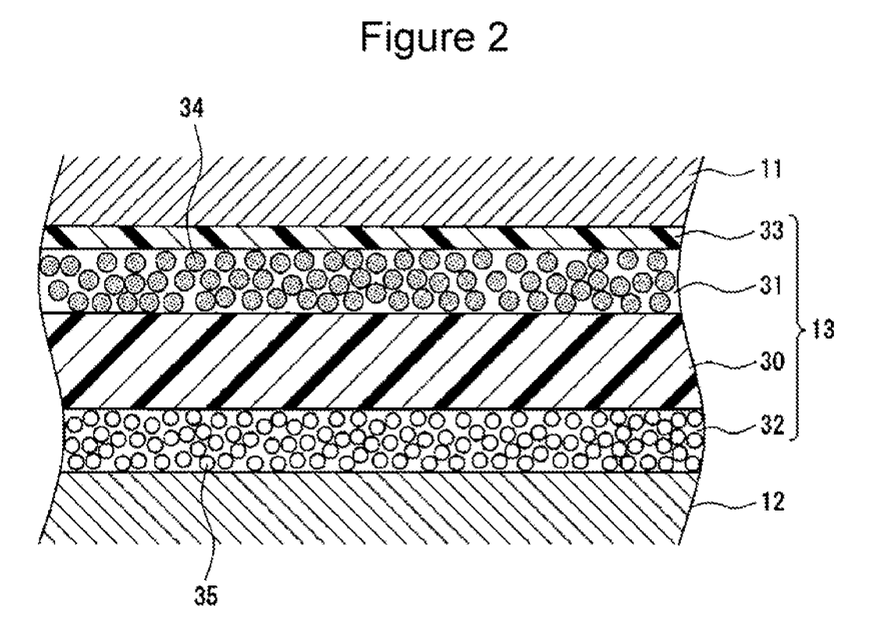
FIG. 2 is a sectional view of an electrode assembly according to an example embodiment.

Hereinbelow, the electrode assembly 14 will be described in detail with reference to FIG. 2, with particular emphasis placed on the separator 13. FIG. 2 is a sectional view of the electrode assembly 14 and, in particular, illustrates a portion of a cross section of the separator 13 with magnification.

[Positive Electrodes]

The positive electrode 11 includes a positive electrode current collector and a positive electrode mixture layer disposed on the current collector. The positive electrode current collector may be, for example, a foil of a metal that is stable at the potentials of the positive electrode 11, such as aluminum, or a film having such a metal as a skin layer. The positive electrode mixture layer includes a positive electrode active material, a conductive agent and a binder, and is preferably disposed on both sides of the positive electrode current collector. The positive electrode 11 may be fabricated by applying a positive electrode mixture slurry including components such as a positive electrode active material, a conductive agent and a binder onto a positive electrode current collector, drying the wet films, and rolling the coatings to form positive electrode mixture layers on both sides of the positive electrode current collector.

Examples of the positive electrode active materials include lithium transition metal oxides containing transition metal elements such as Co, Mn and Ni. To attain an enhancement in the capacity of the nonaqueous electrolyte secondary battery, for example, the lithium transition metal oxide is preferably a Ni-containing lithium transition metal oxide which contains nickel (Ni) and has a Ni proportion of not less than 30 mol % relative to the total number of moles of the metal element(s) except lithium (Li). Examples of the Ni-containing lithium transition metal oxides include oxides represented by the compositional formula $Li_aNi_xM_{(1-x)}O_2$ ($0.95 \le a \le 1.2$, $0.3 \le x < 1.0$, and M denotes a metal element other than Li and Ni). The metal M in the formula may include, for example, at least one selected from cobalt (Co), manganese (Mn), tungsten (W), niobium (Nb), molybdenum (Mo), phosphorus (P) and sulfur (S). The oxide may further contain at least one selected from magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), lead (Pb) and bismuth (Bi). Of these, Co, Mn, etc. are preferable.

Examples of the conductive agents include carbon materials such as carbon black, acetylene black, Ketjen black, graphite, carbon nanotubes, carbon nanofibers and graphene. Examples of the binders include fluororesins such as polytetrafluoroethylene (PTFE) and polyvinylidene fluoride (PVdF), polyacrylonitriles (PAN), polyimides, acrylic resins and polyolefins. These resins may be used in combination with, for example, carboxymethylcellulose (CMC) or a salt thereof, and polyethylene oxide (PEO).

[Negative Electrodes]

The negative electrode 12 includes a negative electrode current collector and a negative electrode mixture layer disposed on the current collector. The negative electrode current collector may be, for example, a foil of a metal that is stable at the potentials of the negative electrode 12, such as copper, or a film having such a metal as a skin layer. The negative electrode mixture layer includes a negative electrode active material and a binder, and is preferably disposed on both sides of the negative electrode current collector. The negative electrode 12 may be fabricated by applying a negative electrode mixture slurry including components such as a negative electrode active material and a binder onto a negative electrode current collector, drying the wet films, and rolling the coatings to form negative electrode mixture layers on both sides of the negative electrode current collector.

The negative electrode active material is not particularly limited as long as it can reversibly store and release lithium ions. Examples of such materials which may be used include carbon materials such as natural graphite and artificial graphite, metals which can be alloyed with Li such as silicon (Si) and tin (Sn), and oxides containing such metal elements as Si and Sn. Further, the negative electrode mixture layers may include a lithium titanium composite oxide. The lithium titanium composite oxide serves as a negative electrode active material. When the lithium titanium composite oxide is used, a conductive agent such as carbon black is preferably added to the negative electrode mixture layers.

Examples of the binders which may be used in the negative electrode mixture layers include fluororesins such as PTFE and PVdF, PAN, polyimides, acrylic resins and polyolefins, similarly to the case of the positive electrode 11. When the negative electrode mixture slurry is prepared using an aqueous solvent, for example, CMC or a salt thereof, styrene-butadiene rubber (SBR), polyacrylic acid (PAA) or a salt thereof, or polyvinyl alcohol (PVA) may be used as the binder.

[Separators]

As illustrated in FIG. 2, the separator 13 includes a substrate 30, a first filler layer 31 which is disposed on one side of the substrate 30 and contains phosphate salt particles 34, and a second filler layer 32 which is disposed on the other side of the substrate 30 and contains inorganic particles 35 with a higher melting point than the phosphate salt particles 34. That is, the separator 13 has a layered structure in which the substrate 30 is interposed between the first filler layer 31 and the second filler layer 32. In the electrode assembly 14, the separator 13 is disposed in such a manner that the side of the substrate 30 which bears the first filler layer 31 is directed to the positive electrode 11 side. When the battery using the separator 13 generates abnormal heat due to short-circuiting or the like, the phosphate salt particles 34 contained in the first filler layer 31 are melted and polymerized to fill pores in the substrate 30. During this process, the second filler layer 32 with high heat resistance ensures the shape stability of the separator 13. As a result, the substrate 30 attains an enhanced shutdown effect and sufficiently suppresses the exothermic reaction at the time of short-circuiting.

In the example illustrated in FIG. 2, a resin layer 33 is disposed between the positive electrode 11 and the first filler layer 31. The resin layer 33 is present between the positive electrode 11 and the first filler layer 31, and is preferably disposed as a constituent element of the separator 13 on the surface of the first filler layer 31. For example, the separator 13 preferably has a layered structure represented by resin layer 33/first filler layer 31/substrate 30/second filler layer 32.

The substrate 30 is composed of a porous sheet having ion permeability and insulating properties, for example, a microporous thin film, a woven fabric, a nonwoven fabric, etc. Examples of the resins which form the substrates 30 include polyolefins such as polyethylene, polypropylene and copolymers of polyethylene and α-olefins, acrylic resins, polystyrenes, polyesters and celluloses. The substrate 30 may be a monolayer structure, or may have a stack structure. The thickness of the substrate 30 is not particularly limited but is, for example, preferably not less than 3 μm and not more than 20 μm.

To ensure ion conductivity during the charging and discharging of the battery, the porosity of the substrate 30 is, for example, preferably not less than 30% and not more than 70%. The porosity of the substrate 30 is determined in the following manner.

(1) Ten circles 2 cm in diameter are punched out from the substrate 30, and the thickness h of the central portion and the mass w are measured with respect to each of the pieces punched out from the substrate 30.

(2) The volume V and mass W of the total of the ten pieces are determined based on the thicknesses h and the masses w, and the porosity e is calculated using the following equation.

$$\text{Porosity } \varepsilon\ (\%) = ((\rho V - W)/(\rho V)) \times 100$$

ρ: Density of material forming substrate

For example, the average pore size of the substrate 30 is 0.02 μm to 5 μm, and preferably 0.05 μm to 1 μm. The average pore size of the substrate 30 is measured with, for example, Perm-Porometer (manufactured by SEIKA CORPORATION) capable of measuring pore sizes by the bubble point method (JIS K3832, ASTM F316-86).

The first filler layer 31 is a porous layer containing phosphate salt particles 34, and has pores in the gaps between the phosphate salt particles 34 for the passage of lithium ions. When, for example, abnormal heat is generated in the charged battery, the phosphate salt particles 34 contained in the first filler layer 31 are melted and polymerized in an accelerated manner by heat and the positive electrode potential to fill pores in the substrate 30, thereby interrupting the ion conduction between the positive and negative electrodes. Further, the substrate 30 itself is melted to close the pores.

For purposes such as to ensure good ion conductivity during the charging and discharging of the battery and to ensure physical strength, the porosity of the first filler layer 31 is, for example, preferably not less than 30% and not more than 70%. The porosity of the first filler layer 31 (and also the second filler layer 32) is calculated using the following equation.

Porosity (%) of first filler layer=100−[[$W$÷($d$×$\rho$)]×100]

W: Basis weight (g/cm$^2$) of first filler layer
d: Thickness (cm) of first filler layer
$\rho$: Average density (g/cm$^3$) of first filler layer Examples of the phosphate salt particles 34 include $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$ and $MgHPO_4$. Of these, from points of view such as the prevention of side reactions, at least one selected from lithium phosphate ($Li_3PO_4$), dilithium hydrogen phosphate ($Li_2HPO_4$) and lithium dihydrogen phosphate ($LiH_2PO_4$) is preferable.

In consideration of the temperatures experienced during battery production, the battery inside temperatures during normal use, and the battery inside temperatures at the time of abnormalities, it is generally preferable that the phosphate salt particles 34 be melted at a temperature of about 140° C. to 190° C.

The BET specific surface area of the phosphate salt particles 34 is preferably not less than 5 m$^2$/g and not more than 100 m$^2$/g, and more preferably not less than 20 m$^2$/g and not more than 100 m$^2$/g. The BET specific surface area may be measured by the BET method (the nitrogen adsorption method) described in JIS R1626. The phosphate salt particles 34 having a BET specific surface area in the above range are melted easily at a temperature of about 140° C. to 190° C., and thus the use of such particles makes it possible to close quickly the pores in the substrate 30 in the event of occurrence of an abnormality in the battery.

For example, the average particle size of the phosphate salt particles 34 is not less than 0.05 μm and not more than 2 μm. If the phosphate salt particles 34 fail to satisfy the above range of average particle size, the amount of heat generated at the time of occurrence of battery abnormality is sometimes increased as compared to when the above range is satisfied. Here, the average particle size is the volume average particle size measured by a laser diffraction method at which the cumulative volume value reaches 50% median of the particle size distribution (this average particle size is also called the 50% particle size). The average particle size may be measured with a laser diffraction scattering grain size distribution analyzer (manufactured by HORIBA, Ltd.). In the present specification, the average particle size means this median diameter unless otherwise mentioned.

Preferably, the average particle size of the phosphate salt particles 34 is 0.05 μm to 1 μm and is smaller than the average pore size of the substrate 30. By using phosphate salt particles 34 having an average particle size smaller than the average pore size of the substrate 30, part of the phosphate salt particles 34 penetrate into the pores of the substrate 30 and easily close the pores of the substrate 30 in the event of occurrence of short-circuiting. The depth in which the phosphate salt particles 34 penetrate into the pores of the substrate 30 is preferably not less than 0.1 μm and not more than 1 μm in the direction of thickness of the substrate 30.

The first filler layer 31 includes a binder which binds together the phosphate salt particles 34. Examples of the binders include polyolefins such as polyethylene, polypropylene and copolymers of polyethylene and α-olefins, fluororesins such as PVdF, PTFE and polyvinyl fluoride (PVF), fluororubbers such as vinylidene fluoride-hexafluoropropylene-tetrafluoroethylene copolymer and ethylene-tetrafluoroethylene copolymer, styrene-butadiene copolymer and hydrides thereof, acrylonitrile-butadiene copolymer and hydrides thereof, acrylonitrile-butadiene-styrene copolymer and hydrides thereof, methacrylate ester-acrylate ester copolymer, styrene-acrylate ester copolymer, acrylonitrile-acrylate ester copolymer, polyvinyl acetate, polyphenylene ether, polysulfone, polyethersulfone, polyphenylenesulfide, polyetherimide, polyamideimide, polyamide, poly-N-vinylacetamide, polyesters, polyacrylonitrile, cellulose, ethylene-vinyl acetate copolymer, polyvinyl chloride, isoprene rubber, butadiene rubber, polymethyl acrylate, polyethyl acrylate, polyvinyl alcohol, CMC, acrylamide, PVA, methylcellulose, guar gum, sodium alginate, carrageenan and xanthan gum, and salts thereof.

The content of the phosphate salt particles 34 is preferably an amount enough to close the pores in the substrate 30. The content is preferably not less than 90 mass %, and more preferably not less than 92 mass % and not more than 98 mass % of the total mass of the first filler layer 31. The content of the binder in the first filler layer 31 is, for example, not less than 2 mass % and not more than 8 mass %.

The thickness of the first filler layer 31 is not particularly limited, but is preferably not less than 1 μm and not more than 10 μm, more preferably not less than 1 μm and not more than 5 μm, and particularly preferably not less than 2 μm and not more than 4 μm. From the point of view of reducing the amount of heat generated in the battery, the thickness of the first filler layer 31 is preferably not less than 2 times and not more than 40 times, and more preferably not less than 3 times and not more than 20 times the average particle size of the phosphate salt particles 34.

The first filler layer 31 may further include a heteropolyacid. The addition of a heteropolyacid probably promotes the polycondensation of the phosphate salt that has been melted. Examples of the heteropolyacids include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid and silicomolybdotungstovanadic acid.

The second filler layer 32 is a porous layer containing inorganic particles 35 with a high melting point (heat resistance), and has pores in the gaps between the inorganic particles 35 for the passage of lithium ions. Similarly to the first filler layer 31, the porosity of the second filler layer 32 is preferably not less than 30% and not more than 70%. The second filler layer 32 has a function to prevent a significant deformation of the substrate 30 due to abnormal heat generation in the battery and thereby enhance the shape stability of the separator 13. By providing the second filler layer 32 that is a heat resistant layer, the shutdown effect of the substrate 30 is enhanced and the exothermic reaction at the time of short-circuiting is sufficiently suppressed.

The inorganic particles 35 are particles which have higher thermal properties such as melting point and thermal decomposition temperature than the phosphate salt particles 34 contained in the first filler layer 31, and are preferably composed of an insulating inorganic compound which is not melted or decomposed during the abnormal heat generation in the battery. Some examples of the inorganic particles 35 are particles of metal oxides, metal oxide hydrates, metal hydroxides, metal nitrides, metal carbides, metal sulfides, etc. For example, the average particle size of the inorganic particles 35 is preferably not less than 0.2 µm and not more than 2 µm. If the inorganic particles fail to satisfy the above range of average particle size, the amount of heat occurring at the time of abnormal heat generation is sometimes increased as compared to when the above range is satisfied.

Examples of the metal oxides and the metal oxide hydrates include aluminum oxide, boehmite ($Al_2O_3H_2O$ or AlOOH), magnesium oxide, titanium oxide, zirconium oxide, silicon oxide, yttrium oxide and zinc oxide. Examples of the metal nitrides include silicon nitride, aluminum nitride, boron nitride and titanium nitride. Examples of the metal carbides include silicon carbide and boron carbide. Examples of the metal sulfides include barium sulfate. Examples of the metal hydroxides include aluminum hydroxide. In the present invention, the melting point of a material which melts after transformation, for example, boehmite into alumina, is the melting point of the material resulting from the transformation.

Further, the inorganic particles 35 may be particles of, for example, porous aluminosilicate salts such as zeolite ($M_{2/n}O \cdot Al_2O_3 \cdot xSiO_2 \cdot yH_2O$ wherein M denotes a metal element, $x \geq 2$ and $y \geq 0$), layered silicate salts such as talc ($Mg_3Si_4O_{10}(OH)_2$), barium titanate ($BaTiO_3$) and strontium titanate ($SrTiO_3$). Of these, from points of view such as insulating properties and heat resistance, at least one selected from aluminum oxide, boehmite, talc, titanium oxide and magnesium oxide is preferable.

The second filler layer 32 includes a binder which binds together the inorganic particles 35. The binder may be a resin similar to one used in the first filler layer 31. The content of the inorganic particles 35 is preferably not less than 90 mass %, and more preferably not less than 92 mass % and not more than 98 mass % of the total mass of the second filler layer 32. The content of the binder in the second filler layer 32 is, for example, not less than 2 mass % and not more than 8 mass %. The thickness of the second filler layer 32 is not particularly limited, but is preferably not less than 1 µm and not more than 5 µm, and particularly preferably not less than 2 µm and not more than 4 µm.

Preferably, the resin layer 33 is formed on the surface of the first filler layer 31 and is in contact with the surface of the positive electrode 11. The resin layer 33 has a function to ensure the adhesion between the first filler layer 31 and the positive electrode 11 when abnormal heat is generated in the battery. By virtue of providing the resin layer 33, the positive electrode 11 and the separator 13 maintain good contact therebetween even when the positive electrode 11 is deformed by a temperature increase inside the battery due to, for example, an internal short-circuit of the battery. Consequently, the phosphate salt particles 34 are allowed to be melted and polycondensed uniformly with ease.

The resin layer 33 is composed of a resin which is melted or softened during hot pressing of the electrode assembly and/or at the time of abnormal heat generation in the charged battery. The resin layer 33 may contain a filler such as an inorganic compound, but is preferably composed of a resin alone. The resin layer 33 may be bonded to the surface of the positive electrode 11 by hot pressing during the fabrication of the electrode assembly. The resin layer 33 may be one which does not exhibit adhesion with respect to the surface of the positive electrode 11 during normal use of the battery and develops the adhesion in the event of abnormal heat generation. The resin layer 33 suitably includes a resin having a glass transition temperature of not more than 130° C. For example, a binder resin used in the electrode mixture layers may be used in the resin layer 33. Some preferred examples of the resins are fluororesins such as PTFE and PVdF, PAN, acrylic resins and polyolefins.

The thickness of the resin layer 33 is not particularly limited, but is preferably not more than 5 µm, more preferably not less than 0.5 µm and not more than 5 µm, and particularly preferably not less than 1 µm and not more than 3 µm. When the thickness is in this range, the resin layer 33 does not adversely affect battery characteristics such as charge discharge characteristics and battery capacity, and easily ensures a good contact between the positive electrode 11 and the separator 13 even when the positive electrode 11 is deformed at the time of occurrence of an abnormality.

The separator 13 having a layered structure represented by resin layer 33/first filler layer 31/substrate 30/second filler layer 32 may be produced by forming a first filler layer 31 and a resin layer 33 sequentially on one side of a porous resin substrate 30, and forming a second filler layer 32 on the other side of the substrate 30. The first filler layer 31 may be formed by providing a slurry composition including phosphate salt particles 34, a binder and a dispersion medium, applying the composition onto one side of a substrate 30, and drying the wet film. The second filler layer 32 may be formed by providing a slurry composition including inorganic particles 35, a binder and a dispersion medium, applying the composition onto the other side of the substrate 30, and drying the wet film. The resin layer 33 may be formed by applying a resin solution onto the surface of the first filler layer 31, and drying the wet film.

As described above, the separator 13 has a structure in which the resin layer 33, the first filler layer 31, the substrate 30 and the second filler layer 32 are stacked in this order, and is disposed between the positive electrode 11 and the negative electrode 12 in such a manner that the resin layer 33 is directed to the positive electrode 11 side. The first filler layer 31 and the resin layer 33 may be formed on both sides of the substrate 30, but are preferably formed on only the side of the substrate 30 opposed to the positive electrode 11 from points of view such as increasing the capacity. For the similar reason, the second filler layer 32 is formed on only the other side of the substrate 30. Incidentally, the melting and polycondensation of the phosphate salt particles 34 contained in the first filler layer 31 are induced not only by heat in the event of occurrence of battery abnormality but also by the potential of the positive electrode 11. Thus, it is preferable that the first filler layer 31 be disposed near the positive electrode 11.

EXAMPLES

Hereinbelow, the present disclosure will be further described based on EXAMPLES. However, it should be construed that the scope of the present disclosure is not limited to such EXAMPLES.

Example 1

[Fabrication of Separator]

In the procedures described below, a separator was fabricated which had a layered structure represented by first filler layer containing phosphate salt particles/polyethylene porous substrate/second filler layer containing boehmite particles.

(1) Lithium phosphate particles ($Li_3PO_4$) having a BET specific surface area of 54.07 $m^2/g$ and an average particle size of 0.93 μm and poly-N-vinylacetamide were mixed together in a mass ratio of 100:6.5, and NMP was added. A first slurry composition having a solid concentration of 15 mass % was thus prepared.

(2) Boehmite particles and poly-N-vinylacetamide were mixed together in a mass ratio of 100:6.5, and N-methyl-2-pyrrolidone (NMP) was added. A second slurry composition having a solid concentration of 15 mass % was thus prepared.

(3) The second slurry composition was applied by a gravure coating method onto one side of a 12 μm thick polyethylene porous monolayer substrate so that the coating thickness after drying would be 4 μm, and the wet film was dried to form a second filler layer.

(4) The first slurry composition was applied by a gravure coating method onto the other side of the porous substrate so that the coating thickness after drying would be 4 μm, and the wet film was dried to form a first filler layer.

A cross section of the separator was exposed with a cross section polisher and was observed with a scanning electron microscope (SEM). Based on the sectional image, the phosphate salt particles were found to have penetrated into the separator substrate with a depth of 0.5 μm in the direction of thickness of the substrate.

[Fabrication of Positive Electrode]

Particles of lithium nickel cobalt aluminum composite oxide represented by $Li_{1.05}Ni_{0.82}Co_{0.15}Al_{0.03}O_2$ were used as positive electrode active material particles. The average secondary particle size of the particles was about 15 μm. The positive electrode active material, carbon black and PVdF were mixed together in a mass ratio of 100:1:1, and N-methyl-2-pyrrolidone was added to the mixture. A positive electrode mixture slurry was thus prepared. Next, the positive electrode mixture slurry was applied to both sides of an aluminum foil as a positive electrode current collector. The wet films were dried and rolled with a roller. Thus, a positive electrode was fabricated in which positive electrode mixture layers were disposed on both sides of the positive electrode current collector. The packing density of the positive electrode mixture layers was 3.70 g/cm³. During the above process, part of the surface of the positive electrode current collector was left exposed from the positive electrode mixture layer, and a positive electrode lead made of aluminum was welded to the exposed portion of the positive electrode.

[Fabrication of Negative Electrode]

Artificial graphite, SiOx (x=1) having a carbon coating layer, CMC-Na (carboxymethylcellulose sodium) and SBR (styrene-butadiene rubber) were mixed together in a mass ratio of 92:8:1:1 in water to give a negative electrode mixture slurry. Next, the negative electrode mixture slurry was applied to both sides of a copper foil as a negative electrode current collector. The wet films were dried and rolled with a roller. Thus, a negative electrode was fabricated in which negative electrode mixture layers were disposed on both sides of the negative electrode current collector. The packing density of the negative electrode mixture layers was 1.70 g/cm³. During the above process, part of the surface of the negative electrode current collector was left exposed from the negative electrode mixture layer, and a negative electrode lead made of nickel was welded to the exposed portion of the negative electrode.

[Preparation of Nonaqueous Electrolyte]

Lithium hexafluorophosphate ($LiPF_6$) was dissolved with a concentration of 1.0 mol/L into a mixed solvent obtained by mixing ethylene carbonate (EC), ethyl methyl carbonate (EMC) and dimethyl carbonate (DMC) in a volume ratio of 3:3:4. Further, vinylene carbonate (VC) was dissolved with a concentration of 1.0 mass % relative to the mixed solvent. A nonaqueous electrolyte was thus prepared.

[Fabrication of Battery]

The positive electrode and the negative electrode were wound together via the separator in such a manner that the first filler layer of the separator was in contact with the positive electrode. The coil thus formed was hot pressed at 80° C. to give a flat wound electrode assembly. The electrode assembly was placed into a battery exterior package composed of an aluminum laminate sheet. The nonaqueous electrolyte was poured, and the exterior package was sealed. A 650 mAh nonaqueous electrolyte secondary battery was thus fabricated.

[Nail Penetration Test]

In an environment at 25° C., the battery fabricated was charged at a constant current of 0.3 It to a battery voltage of 4.2 V, and was thereafter charged at a constant voltage of 4.2 V until the current value reached 0.05 It. The battery was thus brought to a charged state. In an environment at 25° C., the tip of a 3 mmφ round nail was pushed vertically, at a speed of 10 mm/sec, into a lateral central portion of the battery charged above. The operation of the round nail penetration was stopped when the round nail completely pierced the battery. The maximum temperature that was reached was measured with respect to a lateral portion of the battery 5 mm away from the location of nail penetration through the lateral portion of the battery. This nail penetration test can simulate abnormal heat generation stemming from an internal short-circuit of the battery.

Example 2

A battery was fabricated and a nail penetration test was performed in the same manner as in EXAMPLE 1, except that in the fabrication of a separator, dilithium hydrogen phosphate ($Li_2HPO_4$) having a BET specific surface area of 7.10 m²/g and an average particle size of 0.33 μm were used as the phosphate salt particles.

Example 3

A battery was fabricated and a nail penetration test was performed in the same manner as in EXAMPLE 1, except that in the fabrication of a separator, lithium phosphate ($Li_3PO_4$) having a BET specific surface area of 61.35 m²/g and an average particle size of 0.15 μm were used as the phosphate salt particles.

Comparative Example 1

A battery was fabricated and a nail penetration test was performed in the same manner as in EXAMPLE 1, except that in the fabrication of a separator, lithium phosphate ($Li_3PO_4$) having a BET specific surface area of 3.65 m²/g and an average particle size of 1.60 μm were used as the phosphate salt particles.

Comparative Example 2

A battery was fabricated and a nail penetration test was performed in the same manner as in EXAMPLE 1, except that in the fabrication of a separator, the second filler layer was formed between the first filler layer and the substrate.

Comparative Example 3

A battery was fabricated and a nail penetration test was performed in the same manner as in EXAMPLE 1, except that in the fabrication of a separator, a 50:50 by mass mixture of the first slurry composition and the second slurry composition was applied to one side of the polyethylene porous substrate so that the coating thickness after drying would be 4 μm, and thereby a layer was formed which contained the mixture of lithium phosphate particles and boehmite particles.

Comparative Example 4

A battery was fabricated and a nail penetration test was performed in the same manner as in EXAMPLE 1, except that in the fabrication of a separator, the second filler layer was not formed.

Comparative Example 5

A battery was fabricated and a nail penetration test was performed in the same manner as in EXAMPLE 1, except that in the fabrication of a separator, the first filler layer was not formed.

Comparative Example 6

A battery was fabricated and a nail penetration test was performed in the same manner as in EXAMPLE 1, except that in the fabrication of a separator, the first filler layer and the second filler layer were not formed.

REFERENCE SIGNS LIST

10 NONAQUEOUS ELECTROLYTE SECONDARY BATTERY
11 POSITIVE ELECTRODE
12 NEGATIVE ELECTRODE
13 SEPARATOR
14 ELECTRODE ASSEMBLY
15 BATTERY CASE
16 EXTERIOR CASE
17 SEAL BODY
18, 19 INSULATING PLATES
20 POSITIVE ELECTRODE LEAD
21 NEGATIVE ELECTRODE LEAD
22 OVERHANG
23 FILTER
24 LOWER VALVE
25 INSULATING MEMBER
26 UPPER VALVE
27 CAP
28 GASKET
30 SUBSTRATE
31 FIRST FILLER LAYER
32 SECOND FILLER LAYER
33 RESIN LAYER
34 PHOSPHATE SALT PARTICLES
35 INORGANIC PARTICLES

TABLE 1

| | First filler layer | | | | Second filler layer | | |
| --- | --- | --- | --- | --- | --- | --- | --- |
| | Phosphate salt | BET specific surface area | Average particle size | Inorganic particles | Inorganic particles | Location | Maximum temperature reached |
| EX. 1 | $Li_3PO_4$ | 54.07 $m^2/g$ | 0.93 μm | — | Boehmite | Between substrate and negative electrode | 458° C. |
| Ex. 2 | $Li_2HPO_4$ | 7.10 $m^2/g$ | 0.33 μm | — | Boehmite | Between substrate and negative electrode | 460° C. |
| EX. 3 | $Li_3PO_4$ | 61.35 $m^2/g$ | 0.15 μm | — | Boehmite | Between substrate and negative electrode | 453° C. |
| COMP. EX. 1 | $Li_3PO_4$ | 3.65 $m^2/g$ | 1.60 μm | — | Boehmite | Between substrate and negative electrode | 478° C. |
| COMP. EX. 2 | $Li_3PO_4$ | 54.07 $m^2/g$ | 0.93 μm | — | Boehmite | Between first filler layer and substrate | 488° C. |
| COMP. EX. 3 | $Li_3PO_4$ | 54.07 $m^2/g$ | 0.93 μm | Boehmite | — | — | 492° C. |
| COMP. EX. 4 | $Li_3PO_4$ | 54.07 $m^2/g$ | 0.93 μm | — | — | — | 500° C. |
| COMP. EX. 5 | — | — | — | — | Boehmite | Between substrate and negative electrode | 490° C. |
| COMP. EX. 6 | — | — | — | — | — | — | 506° C. |

As shown in Table 1, it has been demonstrated that all the batteries which involved the separators of EXAMPLES attained a significant reduction in the maximum temperature reached during the nail penetration test, as compared to the batteries using the separators of COMPARATIVE EXAMPLES. Heat-suppressing effects at the level of EXAMPLES were not obtained when the BET specific surface area of the phosphate salt particles was less than 5 $m^2/g$ (COMPARATIVE EXAMPLE 1), when the second filler layer was formed between the first filler layer and the substrate (COMPARATIVE EXAMPLE 2), and when either or both of the first filler layer and the second filler layer were absent (COMPARATIVE EXAMPLES 3 to 5).

The invention claimed is:

1. A nonaqueous electrolyte secondary battery comprising a positive electrode, a negative electrode and a separator, wherein
the separator comprises a substrate, a first filler layer disposed on one side of the substrate and containing phosphate salt particles, and a second filler layer disposed on the other side of the substrate and containing inorganic particles with a higher melting point than the phosphate salt particles, the separator being disposed between the positive electrode and the negative electrode in such a manner that the first filler layer is directed to the positive electrode side, and the BET specific surface area of the phosphate salt particles is not less than 5 m²/g and not more than 100 m²/g, wherein the average particle size of the phosphate salt particles is 0.05 μm to 1 μm and is smaller than the average pore size of the substrate, wherein the separator further comprises a resin layer containing a polyolefin, said resin layer being disposed on the surface of the first filler layer and in contact with the positive electrode, wherein the first filler layer comprises a continuous layer configured to cover an entirety of a surface of the substrate on which the first filler layer is disposed, wherein the phosphate salt particles contained in the first filler layer are configured to undergo melting and polycondensation by heat and a potential of the positive electrode, so as to fill pores in the substrate upon generation of a heat, and wherein a porosity of the first filler layer is 30% or more and 70% or less.

2. The nonaqueous electrolyte secondary battery according to claim 1, wherein the BET specific surface area of the phosphate salt particles is not less than 20 m²/g and not more than 100 m²/g.

3. The nonaqueous electrolyte secondary battery according to claim 1, wherein the phosphate salt particles are at least one selected from lithium phosphate, dilithium hydrogen phosphate and lithium dihydrogen phosphate.

* * * * *